Figure 5:
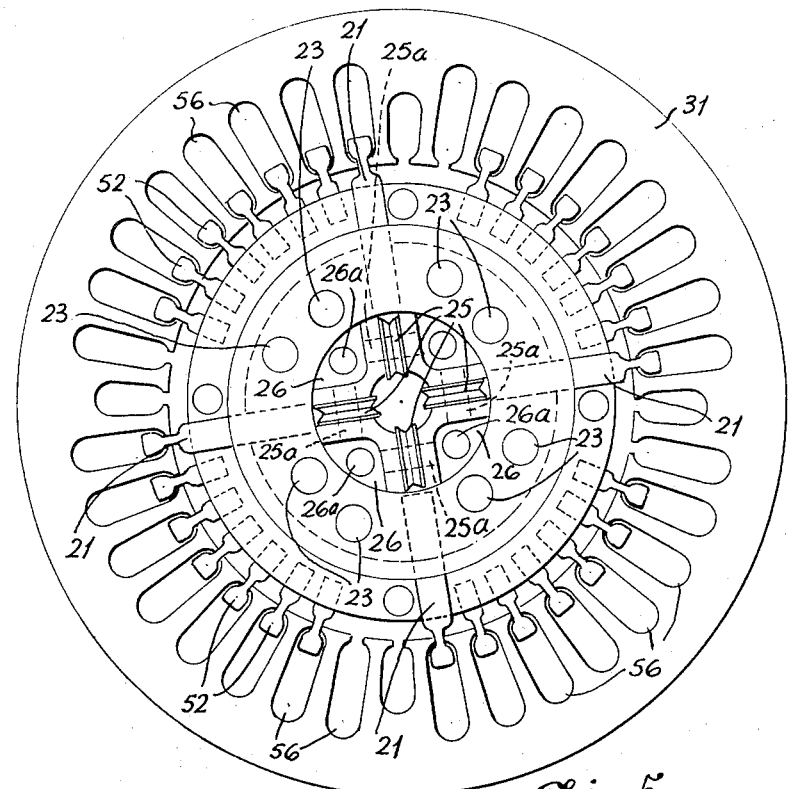

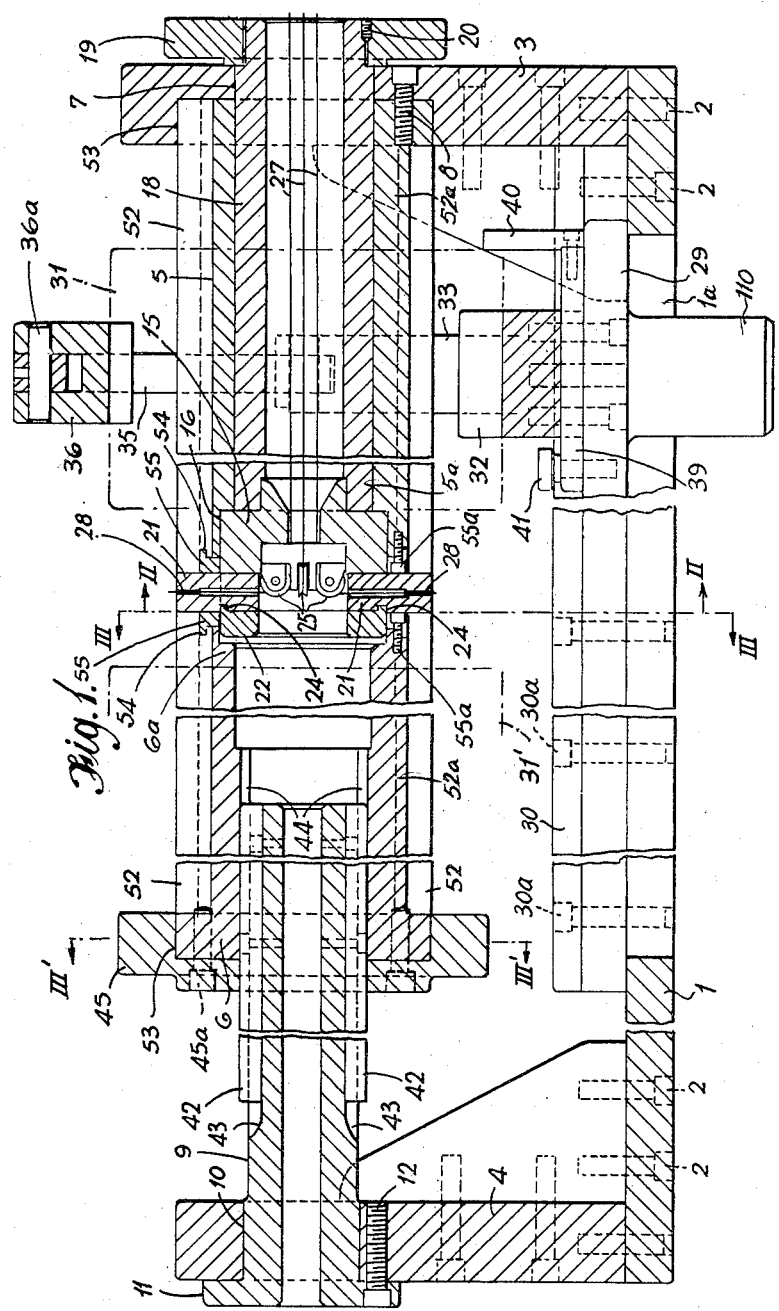

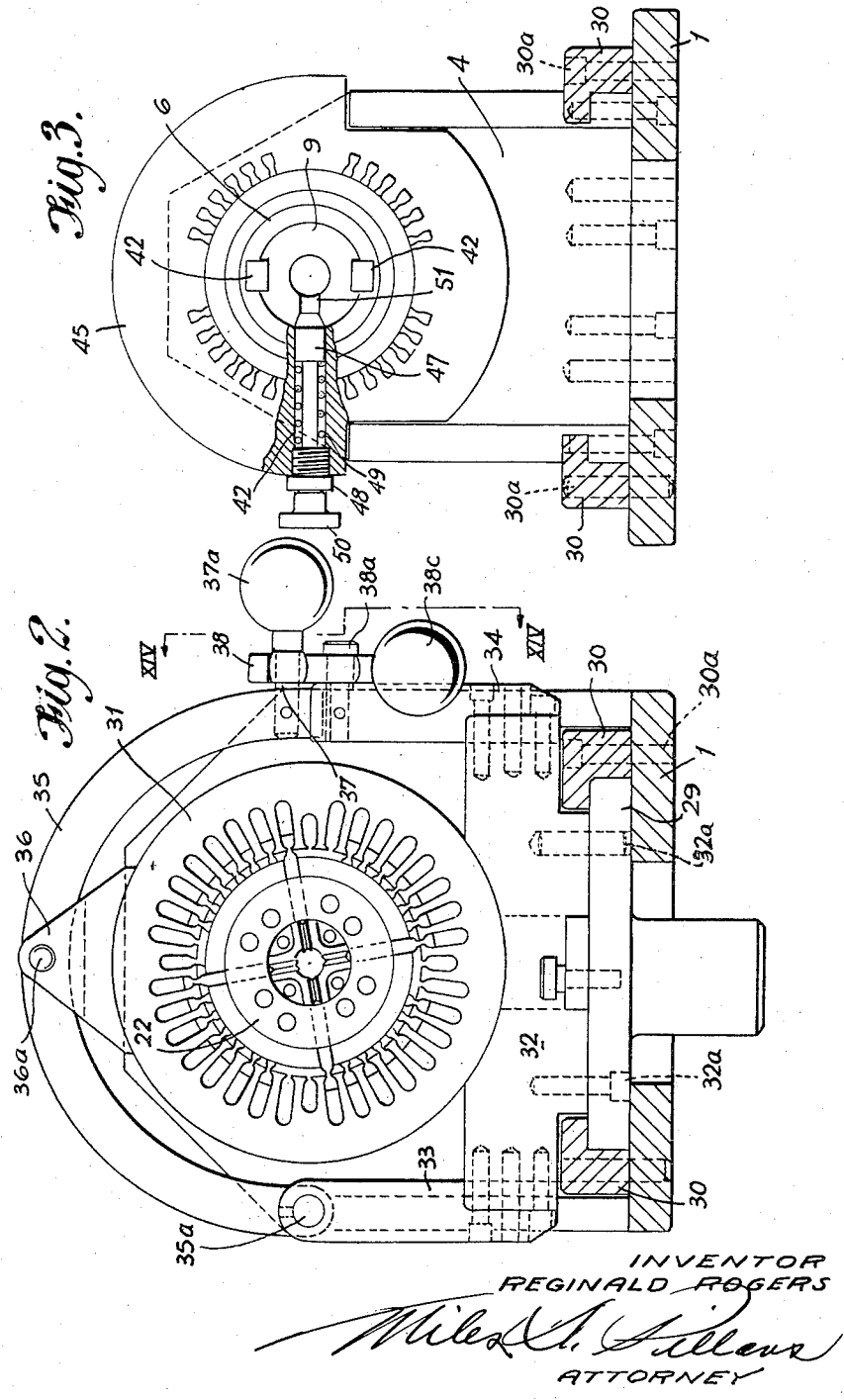

June 26, 1962  R. ROGERS  3,040,998
COIL WINDING MACHINE
Filed May 27, 1957  8 Sheets-Sheet 3
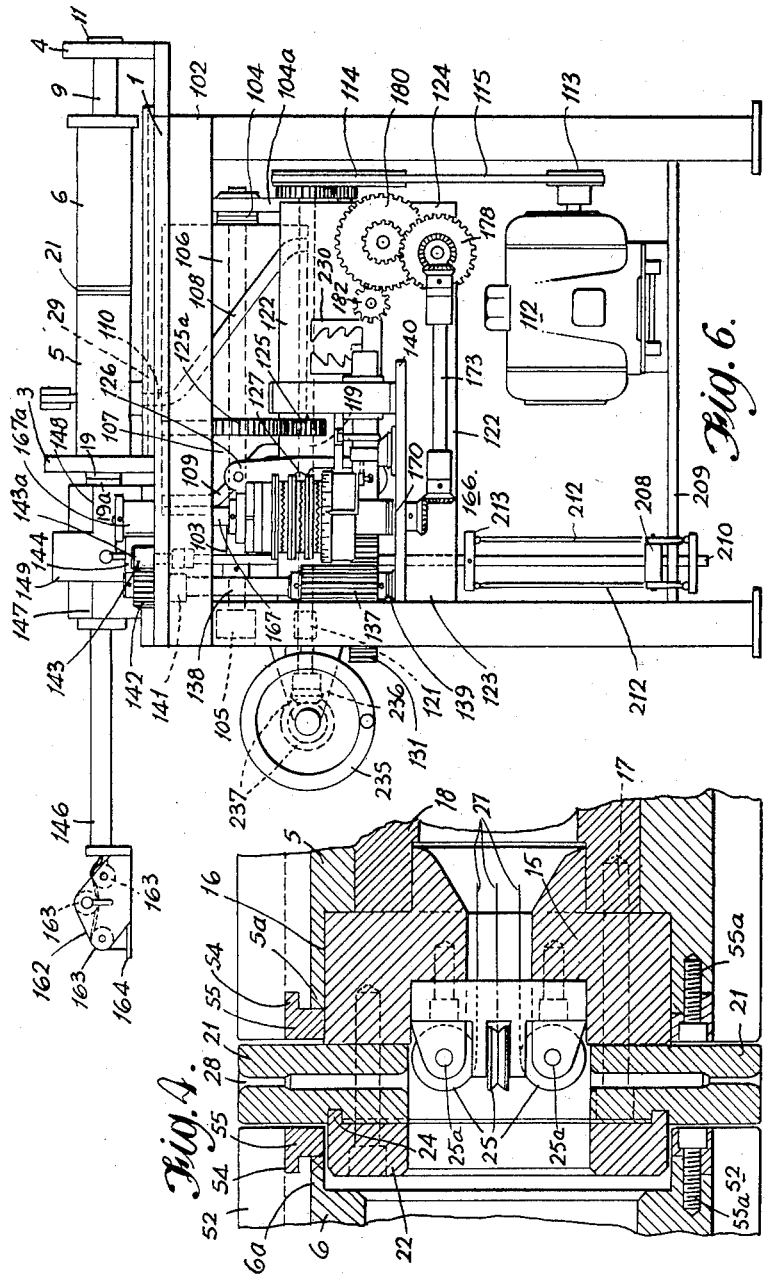
INVENTOR
REGINALD ROGERS
ATTORNEY June 26, 1962   R. ROGERS   3,040,998
COIL WINDING MACHINE
Filed May 27, 1957   8 Sheets-Sheet 4

INVENTOR
REGINALD ROGERS
ATTORNEY

June 26, 1962 R. ROGERS 3,040,998
COIL WINDING MACHINE
Filed May 27, 1957 8 Sheets-Sheet 5

INVENTOR
REGINALD ROGERS
ATTORNEY

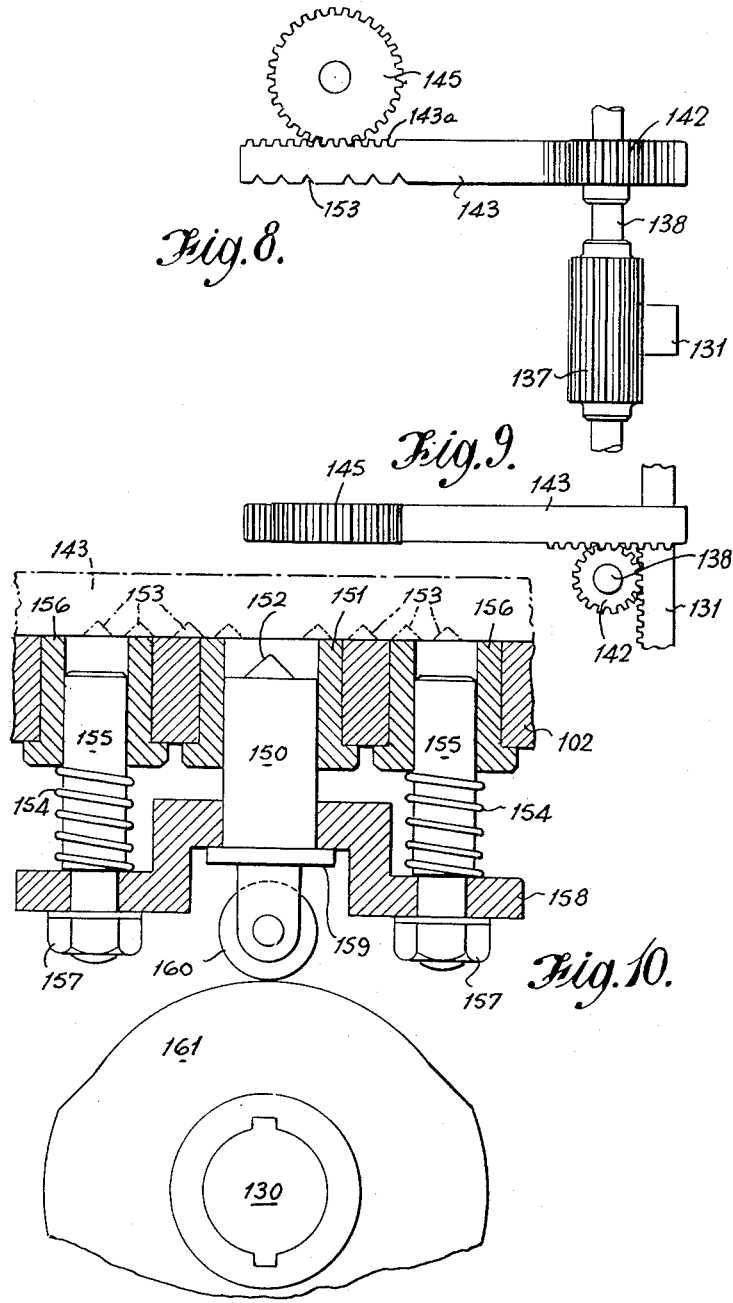

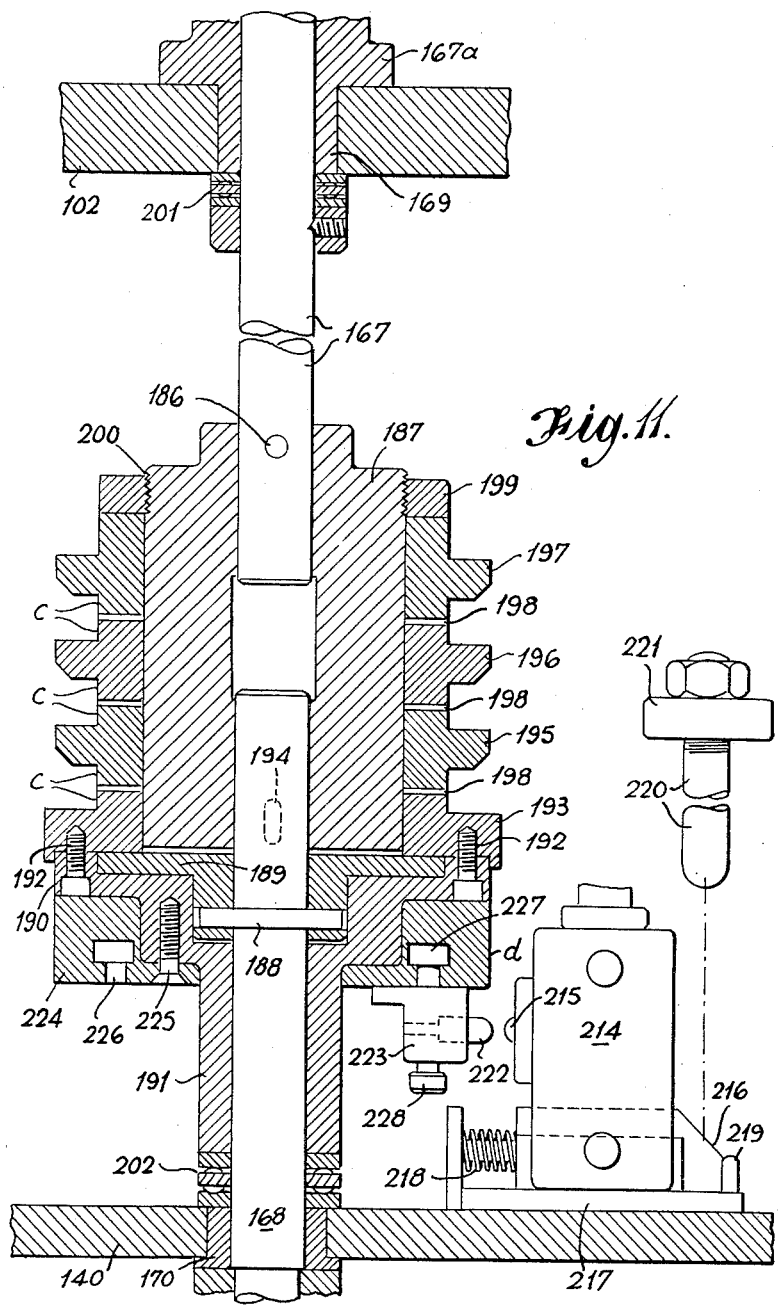

June 26, 1962 R. ROGERS 3,040,998
COIL WINDING MACHINE
Filed May 27, 1957 8 Sheets-Sheet 8
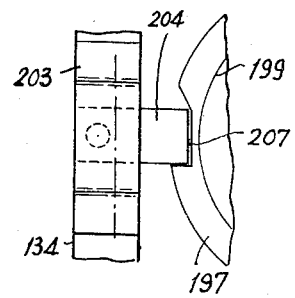
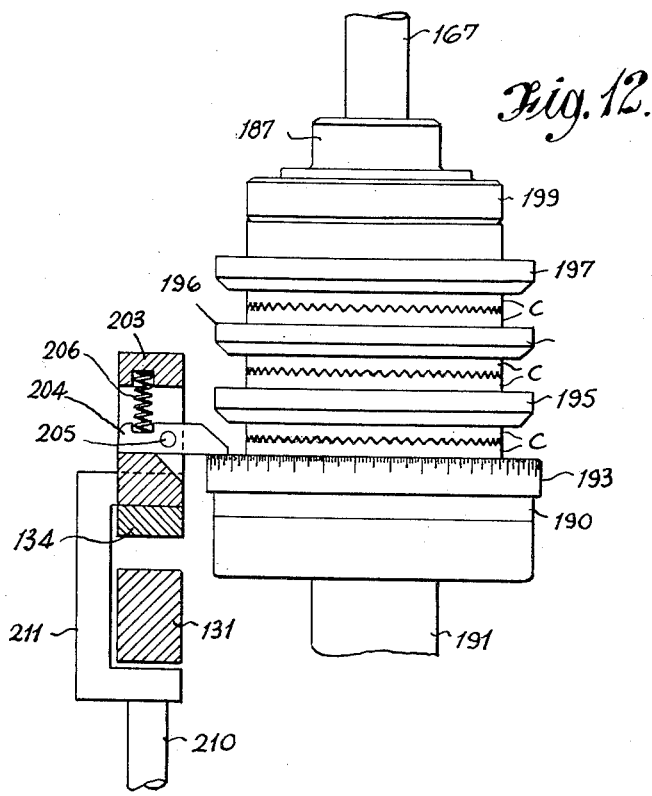
INVENTOR
REGINALD ROGERS
ATTORNEY United States Patent Office 3,040,998
Patented June 26, 1962

3,040,998
COIL WINDING MACHINE
Reginald Rogers, Bradwell, Newcastle, England, assignor to The British Thomson-Houston Company, London, England, a British company
Filed May 27, 1957, Ser. No. 661,883
Claims priority, application Great Britain May 29, 1956
4 Claims. (Cl. 242—1.1)

This invention relates to coil winding machines for winding the coils of dynamo-electric machines, and particularly to machines of the kind comprising feeding means for leading the wire into the slots in the stator core, and means for effecting relative angular movement and relative linear movement between said feeding means and the stator core so as to wind in the slots coils each having a plurality of turns.

Such machines are more particularly employed for winding coils each comprising a comparatively large number of turns of wire of relatively small cross-section and are eminently applicable for winding stator coils of the concentric type in induction motors of the fractional horse-power sizes, although it is to be understood that the invention is not limited in these respects.

A known form of coil winding machine for the purpose above indicated comprises a winding head in which a cylindrical member which serves as a wire locating means as will hereinafter appear, is provided having on the peripheral surface thereof axially extending splines which enter with suitable clearance into the open ends of the stator slots, said member being arranged for feeding the wire of which the stator coils are to be formed into a central space within said member, and provision being made for leading said wire through said central space to a radially extending feed aperture and thence by means of a suitable nose piece having a bore therein, into the stator slots. The machine includes operating mechanism whereby the stator is adapted to be moved back and forth and at the end of each axial excursion thereof to have imparted thereto an angular movement corresponding with the angular pitch or span of the coil being wound. The reciprocating and angular or oscillating movements of the stator are co-ordinated by the mechanism so that a linear movement of the stator in one direction, resulting in the stator moving past said nose piece and laying the wire in that slot passing on this occasion over the nose piece, will be followed by an angular movement of the stator with the nose piece clear of the stator slots, thereby laying one end turn of the coil; the appropriate stator slot is now aligned with the nose piece and the return axial movement of the stator results in the wire being laid in said slot; this return linear movement is followed by a return angular movement laying the other end turn and the cycle of movements is continued until the number of turns required for the coil have been wound. The splines serve to retain the turns in the slots as the coils are wound.

The operating mechanism is provided with means whereby the angular oscillation of the stator can be adjusted so that coils of the required different angular pitches or spans for the winding can be wound.

In an alternative known form of coil winding machine, the winding head comprises means for holding the stator in a fixed linear position, on a suitable support and a splined member, similar to that above referred to, is arranged to receive the linear movement provided by the operating mechanism while the stator core is mounted for oscillation by said mechanism. By alternative linear movements of the splined member and angular movements of the stator core the machine will wind the coils in a similar manner to that already described.

According to the present invention, in a coil winding machine for winding coils in the stator core slots of a dynamo-electric machine, comprises in combination feeding means for leading the wire into the slots and means for effecting relative angular movement and relative linear movement between said feeding means and the stator core so as to wind in the slots coils each having a plurality of turns, and means for automatically changing the limits of said relative angular movement in response to the winding of a predetermined number of turns in a given pair of slots to provide the coil therein, the changes in said limits being such that the next coil to be wound will be wound in the desired slots.

The invention is more particularly, although not eminently applicable to the winding of concentric coils. In such cases the machine according to the invention includes means responsive to the completion of a predetermined number of turns in one pair of slots to increase the relative angular movement between the stator and feeding means to correspond with the next pair of slots, lying one on each side of said first pair of slots.

In carrying out the invention the machine may comprise a counting mechanism which is coupled with the driving mechanism and means for adjustably determining the relative angular movement of the stator and feeding means and responsive to a predetermined number of such angular movements to change the limits of said movement so as to wind succeeding turns in a different pair of slots. The machine may be arranged for winding any desired number of coils in sequence, the counting means, operative by the driving mechanism, being arranged so as to effect the desired number of changes in the relative angular movements of the stator core and the feeding means.

According to a further feature of the invention, the counting means are arranged so as to be readily adjustable, that is to say so that the number of turns which will be wound in one pair of slots before the counting mechanism operates to change the relative angular movement between the stator core and the feeding means can be preset according to requirements, the counting means being therefore applicable for winding various windings having different numbers of turns in each pair of slots.

According to a still further feature of the invention, the counting mechanism comprises a number of movable members coupled with the driving mechanism so as to be displaced in accordance with the numbers of turns wound in the slots, and a co-operating abutment member adapted to engage the surface of said members, said surfaces being interrupted so that said co-operating member will be allowed to move transversely to the direction of movement of said interrupting surface when said member occupies a predetermined position and therefore when, subsequent to a given starting or datum position of said member, a predetermined number of turns have been wound in a pair of slots. The movement of the co-operating member through said interruption in said surface is arrested by a suitable abutment, which in the case of a machine for winding more than two coils will comprise a further displaceable member of similar character to the first, that is to say again having an interrupted surface so that when a given number of turns have been wound in the next pair of slots said co-operating member will move in said interruption in the surface of said second member to be again arrested by an abutment which, if a still further coil is to be wound will again comprise a further displaceable member having an interrupted surface. Said co-operating member is arranged to control the limits of angular movements of the feeding member relative to the stator core.

According to a still further feature of the invention, the limits of relative angular movements of the stator core and feeding member are determined by a variable stroke cam or other mechanism driven in synchronism with the reciprocating means for effecting relative linear movement between the stator core and the feeding member, so as to produce variable strokes of an operating member coupled with the stator core or the feeding member for providing the required relative angular movement. Said member may be coupled with an operating cam by a variable stroke linkage, the adjusting member of which is formed by the co-operating member hereinbefore referred to.

The interrupted members referred to, which may conveniently comprise discs mounted on a common operating shaft or member, while the co-operating member is arranged for movement in an axial plane of said shaft, are preferably mounted in readily adjustable manner so as to determine the distance between the interruptions in successive surfaces and thereby the number of turns which will be wound in each coil. By this means again the machine is adapted, and readily adjustable, for windings having various numbers of turns in successive coils.

In a preferred arrangement the operating mechanism comprises a driving member, means coupled with said member for effecting relative movement between the stator and the feeding means, means coupled with said driving member for converting rotation thereof to intermittent oscillating movement of a pivoted member, a reciprocating member having a connection with said pivoted member and movable to vary the distance between said connection and the pivotal axis of said oscillating member, said reciprocating member being coupled with the means for effecting relative movement between the stator core and feeding member and said connection being movable in relation to said pivotal axis under control of the means responsive to the number of turns wound in a given pair of slots. The reciprocating member may comprise a rack bar carried by a carriage movable perpendicularly to the direction of movement of the rack bar, said bar being in mesh with a tooth member having an elongated tooth face and coupled with means for effecting the relative movement between the stator core and feeding means.

Figure 14:
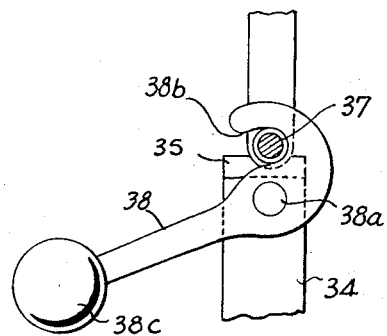
Figure 1:
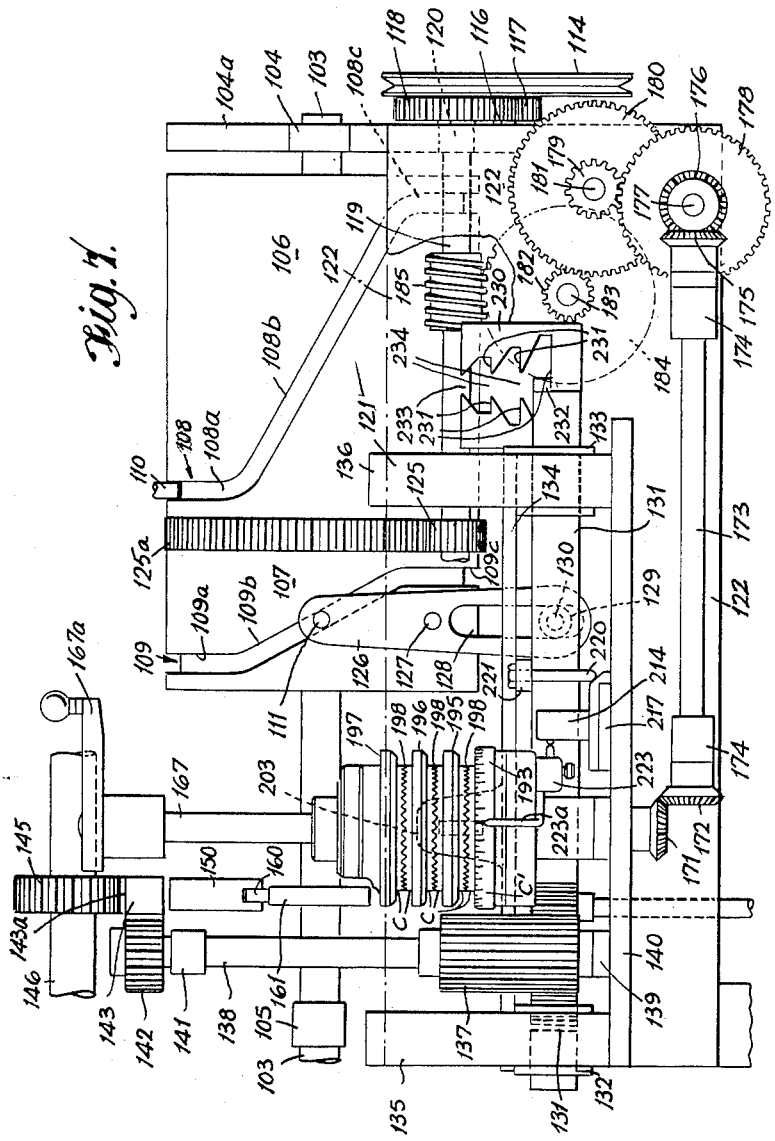

One embodiment of the invention will now be described by way of example with reference to the accompanying drawings, in which:

FIG. 1 is a sectional elevation of the winding head with certain parts broken away, as will hereinafter be indicated, FIG. 2 is a transverse elevation taken on the line II—II of FIG. 1, FIG. 3 is a transverse elevation taken mainly on the line III—III of FIG. 1 and partly on the line III'—III' of FIG. 1 with part removed for clarity of illustration, FIG. 4 shows a central part of FIG. 1 drawn to an enlarged scale, FIG. 5 shows a central part of FIG. 2 drawn to the same scale as FIG. 4, FIG. 6 is a side elevation of a winding machine comprising the winding head of the preceding figures and a preferred form of operating mechanism therefor, FIG. 7 is a view partly diagrammatic showing the operating mechanism of FIG. 6 to a larger scale and in more detail, FIGS. 8 and 9 are respectively a fragmentary elevation and a fragmentary plan of a detail of the operating mechanism of FIGS. 6 and 7, FIG. 10 is a fragmentary cross-sectional elevation showing certain details of the operating mechanism of FIGS. 6 and 7, FIG. 11 is a vertical cross-sectional elevation of part of the operating mechanism of FIGS. 6 and 7 and drawn to a still larger scale than FIG. 7, FIG. 12 is an elevation of certain details of the mechanism of FIGS. 6 and 7 taken in a vertical plane at right angles to that of FIGS. 6, 7 and 11 and drawn to the same scale as FIG. 7, FIG. 13 is a fragmentary plan view corresponding with FIG. 12, and FIG. 14 is a fragmentary elevation taken on the line XIV—XIV of FIG. 2 and showing a detail thereof.

The winding head in the embodiment of FIGS. 1, 2 and 3 comprises a bed-plate 1 of elongated rectangular form which has secured to the ends thereof, such as by screws 2, brackets 3 and 4. These brackets support two splined members 5 and 6 of tubular construction, the member 5 being received in a bore 7 of the bracket 3 and secured thereto by screws such as 8. The splined member 6 is slidably mounted on a tubular support 9 which extends in cantilever fashion from the bracket 4, being received in a bore 10 in said bracket and secured to the latter by means of a flanged end 11 on the member 9 and screws such as 12. The bed-plate 1 and members 5, 6 and 9 are illustrated with portions thereof broken away, the complete winding head being illustrated generally in FIG. 6.

In the illustrated normal or operative position of the splined member 6 the end 6a thereof is disposed only a short distance from the adjacent end 5a of the splined member 5. A cup-shaped member 15 (see also FIG. 4) is journalled within a recess 16 in said end of the member 5 and is made fast, such as by screws 17, to a tubular shaft 18 extending through the supporting bracket 3 and carrying a coupling flange 19 keyed to said shaft at 20. As hereinafter described the flange 19 is connected with suitable operating mechanism. The cup-shaped member 15 is registered against axial movement by engagement of the end face thereof in the recess 16 and engagement of the coupling flange 19 with the bracket 3.

The cup-shaped member 15 carries the feeding member for each coil being wound. In the form illustrated (see particularly FIGS. 4 and 5) the winding head is adapted to wind simultaneously all the poles of a four-pole stator and four wire feeding members are provided, these members comprising blocks 21 which are received in respective slots in the rim of the member 15 and are retained therein by a clamping ring 22 secured removably in the member 15, such as by screws 23. This clamping ring is formed adjacent the blocks 21 with dogs 24 which enter corresponding notches in said blocks and thereby serve to register the latter in the illustrated radial position.

Within the member 15 pulleys or sheaves 25 are journalled by means of pins 25a, said pins being supported in trunnion blocks 26 secured within the member 15 by screws 26a. Separate wires for the four poles of the machine are led into the tubular shaft 18, three of such wires appearing at 27 in FIGS. 1 and 4, and after being passed round the sheaves 25 are threaded through bores 28 in the feeding members i.e. blocks 21.

A slide member or saddle 29 is mounted on the upper face of the bed-plate 1 and is guided for longitudinal movement thereon by flanged guides 30 secured to the bed-plate by screws 30a. The slide member is provided with clamping means to hold a stator core shown at 31 in FIGS. 2 and 5. Said clamping means comprise a chock 32 secured to the slide member by screws 32a, FIG. 2, this chock having an upper surface with an arcuate recess in which the outer peripheral surface of the stator core seats. Vertical pillars 33 and 34 are secured respectively to the two ends of the chock, as can be seen most clearly from FIG. 2. An arcuate yoke bar 35 is pivotally connected by a pin 35a with the upper end of the pillar 33 and a clamping pad 36 having an arcuatae under surface engaging with the outer peripheral surface of the stator core is pivotally connected to said clamping bar by a pin 36a. The other end of the yoke bar 35 carries an outwardly extending pin 37 which is engaged by a cam-slot in a clamping lever 38 pivotally mounted by a pin 38a on the pillar 34. This clamping lever is shown also in the fragmentary elevation in FIG. 14 which shows clearly the form of the cam slot. It will be noted that said slot is open-ended so that after the yoke bar 35 has been pivoted to bring the pin 37 in proximity with the pillar 34 the lever 38 may be rotated so that the cam surface formed by the radially outer end of said slot, namely at 38b will engage the pin 37 and draw the clamping pad 36 firmly on to the stator core 31 to hold the latter in place. The pin 37 and lever 38 conveniently carry operating knobs 37a and 38c.

Conveniently a removable jig member comprising a plate 39 (FIG. 1) and an upstanding abutment member 40 is removably secured to the saddle 29 by means of a thumb screw 41, the member 39 extending through the chock 32. This jig member is readily replaceable by a different jig member for use with a stator core of different length.

The splined member 6 which as hereinbefore stated is slidably mounted on the member 9 is registered against rotation by keys 42 secured in longitudinal slots 43 in the member 9 and engaging in slots 44 in the internal surface of the member 6. An annular disc 45 is secured to the end of the member 6 by screws such as 45a. In a radial bore 46 (FIG. 3) of said disc 45 there is slidably located a plunger 47 extending through a bore in a plug 48 screw-threaded into the bore 46. The plunger is urged inwardly by means of a compression spring 49 and is adapted to be drawn outwardly by means of an operating knob 50. In the normal or operative position of the member 6 the inner end of the plunger 47, which is of conical form as shown in FIG. 3, enters a corresponding radial bore 51 in the member 9, whereby releasably to lock the member 6 in said position.

The splines on the members 5 and 6 are indicated at 52 and are, in the preferred embodiment illustrated, separate members mounted in readily interchangeable manner on the members 5 and 6. For this purpose the latter members are formed with longitudinal slots 52a in which the splined members 52 are respectively received and the bracket 3 and disc 45 are formed with recesses 53 concentric with the members 5 and 6 and engaging at their peripheral surfaces with the outer surfaces of the splines 52. At their end adjacent the feeding blocks 21 the splines 52 have notches receiving flanges 54 extending axially from retaining rings 55 which are secured to the end faces of the members 5 and 6 by screws, such as 55a.

As FIG. 5 shows most clearly the splines 52 are of generally bull-head cross section, that is to say have radially outer portions substantially filling the width of the stator slots, such as 56, which radially outer portions are connected by webs of reduced thickness received with appreciable clearance in the open ends of the stator slots with radially inner enlargements of generally rectangular cross-section received snugly in the slots on the members 5 and 6.

In operation the member 6 is released from the member 9 by withdrawing the knob 50 (FIG. 3), and is then moved toward the bracket 4 (FIG. 1) by a sufficient distance providing a gap between the end of the member 6 and the cup-shaped member 15 and its clamping ring 22 for the passage of the stator core. The stator core is then moved axially on to the splined member 5 and with the slide 29 suitably positioned is clamped on to the latter in the manner hereinbefore described. The shaft 18 is brought into an angular position aligning the feeding members 21 with the first slots in which the coils are to be wound and the wires 27 are suitably secured to the stator core. The member 6 is then returned to its illustrated operative position.

Operating mechanism is provided for effecting alternate axial movements in opposite directions of the slide 29 and stator core 31 with intervening periods of rest during which the shaft 18 is rotated or turned alternately in opposite directions through an angle corresponding to a coil end turn span. A preferred form of such operating mechanism will hereinafter be described, but it will be convenient at this stage to describe the manner in which the coils are wound on the stator.

On starting the machine the slide 29 first moves from its illustrated position to a corresponding position to the other side of the feeding members, bringing the stator core to the position indicated in chain lines at 31' in FIG. 1. The wires 27 are thereby laid in the four stator slots which during this operation are in alignment with the feeding members 21. The shaft 18 is then moved angularly so as to bring the feeding members 21 in alignment with the stator slots in which the second side of the coil is to be wound. The slide 29 and stator core 31 then return to their original positions so that the wires are laid in the last-mentioned slots. A return angular movement of the shaft 18 and feeding members 21 is then effected so that said members are again aligned with the first-mentioned slots. The above described sequence of operations is repeated so as to lay the desired number of turns in the two sets of slots for providing the required coils.

A preferred operating mechanism for the slide and the feeding member will now be described with reference to FIGS. 6 to 10.

Referring to FIGS. 6 and 7, the bed-plate of the winding head is mounted on a table 102 below which the operating mechanism is mounted. This mechanism comprises a horizontal shaft 103 journalled at one end by means of a bearing 104 in a frame plate 104a secured to the underside of the table 102, and at the other end by means of a bearing block 105 mounted on the underside of said table. The shaft carries a pair of drum cams 106 and 107 having on the outer peripheral surfaces thereof cam grooves 108 and 109 (FIG. 6) in which engage respective cam-followers or spigots 110 and 111 mounted as will be described for movement in a direction parallel with the axis of rotation of the cam. Each cam slot is of such form that on constant speed rotation of the drum the cam-follower will be displaced axially along the drum to provide the required sequence of movements of the cam follower. The shaft 103 is driven through suitable reduction gearing, for example from an electric motor 112 mounted beneath the table. The reduction gear comprises pulleys 113 and 114 inter-connected by a belt 115. The pulley 114 is loosely mounted on a stub axle 116 carried by the frame plate 104a. A pinion 117 secured to the pulley 114 is in mesh with a gear wheel 118 which is made fast to a lay shaft 119 which is journalled at one end by a bearing 120 in the frame plate 104a and at its other end in a bearing at 121 carried by a frame plate 122 which extends across the table, being secured at one end 123, to one of the legs of said table and being secured at its opposite end, 124, to one vertical edge of the frame plate 104a. A pinion 125 made fast to the lay shaft 119 is in mesh with a gear ring 125a formed integrally with the drums 106 and 107.

The cam slot in the drum 106 comprises a circular or arcuate portion 108a (FIG. 7) adjacent one end of the drum and of constant distance from the end of the drum, followed by a helical portion 108b connecting said first portion with a circular or arcuate portion 108c adjacent and at constant distance from the other end of the drum, and a second helical portion connecting the portion 108c with the portion 108a. The cam slot on the cam drum 107 is of similar formation to that of the first drum, comprising portions 109a, 109b, 109c and a further helical portion connecting together portions 109a and 109c.

The cam-follower 110 is formed as a depending spigot from the underside of the saddle 29 and working in a slot 1a in the frame plate.

The spigot 111 co-operating with the second cam drum 107 is mounted on the upper end of a lever 126 pivotally mounted at 127 on the frame plate 122. This lever extends in a generally vertical direction downwardly from said spigot and has at its lower end a slot 128 in which engages a roller 129 carried by a pin 130 from a toothed rack bar 131. The rack bar is guided for horizontal movement parallel with the axis of the winding head by means of a pair of guide blocks 132 and 133 having therein rectangular openings through which the rack bar extends. These blocks form with a horizontal bar 134, to the ends of which said blocks are secured, a carriage which is guided for vertical movement by means of guide pillars 135 and 136 secured to the frame plate 122. As also shown in FIGS. 8 and 9, the rack bar 131 is in mesh with an elongated pinion 137 which is made fast to a vertical shaft 138 which at its lower end is journalled by a bearing 139 in a horizontal plate 140 which extends outwardly from the frame plate 122 and is for example welded thereto. At its upper end the shaft 138 is journalled by a bearing at 141 in the table 102. A pinion 142 located above the table is made fast to the upper end of the shaft 138 and meshes with a further rack bar 143 (FIG. 9) which extends across the table and is guided for longitudinal movement by a pair of guide members, one of which appears at 144 in FIG. 6, said guide members being located respectively adjacent the front and rear edges of the table 102. The rack bar 143 has in addition to the vertical toothed face engaging with the pinion 142 an upper toothed face 143a which is in mesh with a gear wheel 145 (see FIGS. 7, 8, and 9) which is made fast to a tubular shaft 146 (see also FIG. 6), the latter being journalled by bearings at 147 and 148 in a casing 149 secured to the table 102. The shaft 146 is coupled at 19, 19a, with the sleeve 18 of FIG. 1. It will be noted that in FIGS. 6 and 7 the left-hand end of the winding head is that end which is shown at the right-hand in FIG. 1.

As shown most clearly in FIGS. 7 and 10, a plunger 150 is slidably mounted in a sleeve 151 in a bore in the table 102, the upper end of this plunger being of V-form at 152 for entry into corresponding V notches 153 (FIG. 8) formed in the underside of the rack bar 143 for a purpose which will hereinafter appear. The plunger 150 is biased downwardly by means of a pair of compression springs 154 which surround pillars 155 slidably received in further sleeves 156 in bores in the table 102. These pillars are secured by nuts 157 to a bridge member 158 and thereby connected with the plunger 150 by means of a shoulder 159 on the latter. The plunger 150 has a forked lower end in which is pivotally mounted a roller 160 bearing on a two-lobed disc cam 161 which is made fast to the shaft 103 and raises the plunger 150 into engagement with the notches 153 in a manner hereinafter to be described. The cam 161 is only partly shown in FIG. 10, but is symmetrical about its horizontal centre line in said figure.

The shaft 146 (FIG. 6) carries at its left-hand end a pair of plates, such as 162, between which are journalled three rollers 163. A guide plate 164 located between the plates 162 is provided with four apertures through which four wires 27 are led and passed over the rollers 163 in the manner shown to the tube 146, extending therethrough and through the sleeve 18 of FIG. 1 to the feeding members 21 in the manner already described. The wires 27 are drawn from spools (not shown) rotatably mounted on any suitable supporting means.

The machine shown in FIGS. 6 and 7 includes a counting mechanism, in accordance with the present invention. The arrangement and operation of this counting mechanism will be fully described after the operation of the winding head of FIGS. 1 to 5 has been indicated.

In operation, with a stator core clamped on the saddle 29 of the winding head and the wires 27 led through the feeding members 21, rotation of the shaft 103 by the motor 112 will cause reciprocating movement of the saddle 29 on the bed-plate 1, and the cam 107 will cause oscillation of the lever 126 about the pivot 127. This movement is translated by the pin and slot connection 128, 129, 130, into reciprocating movement of the rack bar 131 and transmitted by the shaft 138 to the rack bar 143, whereby to effect by the engagement of said bar 143 with the gear wheel 145 oscillation of the feeding members 21.

It will be clear that the formation of the cam slots 108 and 109 is such that the reciprocating and oscillating movements above referred to each comprise periods of movement in opposite directions to one another separated by periods of rest. It will further be seen that whilst the two cams are mounted on the shaft 103 in phase with one another the cam-followers 110 and 111 are mounted at points displaced by 90° from one another about the axis of said shaft, so that there will be a phase difference of 90° between the movements of the saddle and the feeding members. It will further be seen that the arrangement is such that the movement of the saddle occurs whilst the feeding members are at rest, while said feeding members are moved when the saddle is at rest. By this means the wire is laid in the required slots to form the desired coils, it being understood that the ratio of distances between cam-follower 111 and pivot 127 on the one hand, and between pivot 127 and pin 130 on the other hand, is such as to provide from the cam 107 the desired angular movement of the feeding members corresponding with the coil span being wound.

The notches 153 (FIG. 8) are positioned so as to correspond with the positions of the feeding members in alignment with the stator slots, and the cam 161 (FIG. 7) is so angularly positioned on the shaft 103 in relation to the cam 107 that the plunger 150 occupies its illustrated position during the movement of the lever 126 and therefore of the rack bar 143, whereas during the time when the lever 126 is stationary the portions 109a and 109c of the cam 107 engage the pin 111 and the cam 161 will urge the plunger 150 upwardly so that the portion 152 (FIG. 10) of said plunger enters the slot 153 which is at the time adjacent thereto, whereby accurately to position the rack bar 143 and thereby accurately position the feeding members in alignment with the required stator slots. The cam 161 retains the plunger 150 in the required position during the reciprocating movements of the saddle and stator core.

The counting mechanism comprises a counting shaft (FIGS. 6, 7, 11 and 12) consisting of upper and lower parts 167 and 168 which are maintained in alignment with one another in a manner hereinafter to be described and which are journalled, respectively, in the table 102 by means of a bearing 169 and in the plate 140 by means of a bearing 170. The shaft 168 has made fast thereto a bevel wheel 171 in mesh with a bevel wheel 172 made fast to a shaft 173 which is journalled in bearings formed by lugs 174 secured such as by welding to the frame plate 122. A second bevel wheel 175 also made fast to the shaft 173 is in mesh with a bevel wheel 176 working on a stub axle 177 carried by the frame plate 122. The bevel wheel 176 is made fast to a spur gear 178 which is in mesh with a pinion 179 in turn made fast to a spur gear 180, the pinion 179 and gear 180 being loosely mounted on a stub axle 181 carried by the frame plate 122. The spur gear is in mesh with a pinion 182 made fast to a shaft 183 which is journalled in the frame plate 122 and has made fast thereto in rear of said frame plate a worm wheel 184 (FIG. 7) in mesh with a worm 185 which is made fast to the shaft 119. The counting shaft is thus coupled with the lay shaft 119 by a reduction gear which in this example has a velocity ratio of 1000:1. The cam drums 106 and 107 are driven from the lay shaft by means of the pinion 125 and gear ring 125a also with a velocity reduction which in this example is of 5:1. The counting shaft is therefore driven with respect to the cam drums at a velocity reduction of 200:1.

As seen most clearly in FIG. 11, the shaft 167 has made fast thereto, such as by a pin 186, a drum 187 in the bore of which the upper end of the shaft 168 is loosely journalled.

The shaft 168 has made fast thereto, such as by a pin 188, a ratchet wheel 189 which is surrounded by a ratchet housing member 190 having a boss 191 through which the shaft 168 loosely extends. The ratchet housing 190 has pivotally mounted therein spring biased pawls co-operating with the ratchet wheel 189, the arrangement being such that motion of the shaft 168 in the clockwise direction when viewed in plan will be transmitted to the housing 190. The ratchet device is of conventional construction and it is therefor considered unnecessary to illustrate or describe herein the details thereof. It may be stated here that during operation of the machine the shaft 168 is driven in said clockwise direction when viewed in plan.

The ratchet housing is secured by a plurality of bolts, such as the bolt 192 to an annular disc 193 which surrounds the lower end of the drum 187 and is angularly secured to said drum by means of a key 194. The drum 187 carries a plurality, three in the example shown, of axially spaced annular discs 195, 196 and 197. The number of these annular discs together with the disc 193 is equal to the number of coils required in the winding. Adjacent discs are provided therebetween with serrated surfaces engaging with one another, the serrations being indicated at 198 and extending radially of the discs whereby to transmit rotation of the disc 193 in turn to the discs 195, 196 and 197. The discs are releasably held in engagement with one another with the serrations in driving contact by means of an internally threaded locking ring 199 received on an external screw thread 200 at the upper end of the drum 187. The pressure of the locking ring 199 acts downwardly through the several discs on to the ratchet housing 190, but said pressure is taken by thrust ball races 201 and 202 (FIG. 11), between the shaft 167 and the table 102 on the one hand and the boss 191 and plate 140 on the other hand.

A handle 167a is made fast to the upper end of the shaft 167 extending above the table 102, this handle being employed for re-setting the machine in the manner hereinafter to be described.

The bar 134 forming part of the carriage for the rack bar 131 is provided in rear of the counting shaft with an upwardly extending lug 203 (see particularly FIGS. 7, 12, and 13), having a central opening in which a nose or abutment member 204 is pivotally mounted by means of a pin 205. The member 204 is biased to its illustrated position (FIG. 12) by means of a compression spring 206.

The nose member 204 projects in radial alignment with the axis of the counting shaft 167 and within the circumference of the discs 195, 196 and 197. Said discs are each provided with a peripheral notch as can be seen at 207 in FIG. 13.

As hereinbefore described, the rack bar carriage comprising members 132, 133 and 134 is vertically movable on the guides 135 and 136. Said carriage is illustrated in its lowermost position and is adapted to be moved upwardly by means of a foot pedal 208 (FIG. 6) which is pivotally mounted, for example on a tie bar 209, between the legs of the table, said pedal being connected in rear of said tie bar with the lower end of a push-rod 210 which at its upper end is connected (FIG. 12) by means of a stirrup 211 with the carriage bar 134. Tension springs 212 are connected at their upper ends with a member 213 secured to the rod 210 and at their lower ends with a convenient fixed point of the table whereby to provide a force urging the carriage downwardly.

A control switch indicated generally at 214 in FIGS. 7 and 11 is mounted on the plate 140. This switch may be of any convenient construction having contacts which are adapted to be operated by means of a button or pressel 215, but is conveniently of the well-known "Microswitch" type, such as described in British Letters Patent No. 419,-917. The switch is mounted on a slide member or carriage 216 movable on a guide 217 in a direction radial to the shaft 168. The member 216 is urged away from said shaft by means of a compression spring 218 to a position determined by a stop pin 219. The member 215 is, however, adapted to be moved toward the shaft 168 by means of a plunger 220 carried in a lug 221 formed on the carriage bar 134. The pressel 215 is adapted to be engaged in a manner hereinafter to be described by a cam segment 222 which is carried by a block 223 which in turn is carried by an annular member 224 secured, such as by screws 225, to the member 190. The member 224 has formed therein an annular T slot 226 in which is slidably located a bolt 227 extending through the block 223 and by means of which bolt and a thumb nut 228 said block is adapted to be secured to the member 224, but in adjustable angular position thereon.

In the operation of the machine employing the counting mechanism above described, after the stator core to be wound has been secured in position on the saddle as hereinbefore described, and the wires led through the feeding members have had their ends suitably secured with respect to the stator core, the shaft 167 is turned in the clockwise direction by means of the handle 167a to a datum position which may be indicated by a suitable index on the table 102; the ratchet 189, 190 permits this setting movement of the shaft 167. The operator depresses the foot pedal 208 (FIG. 6) whereby the carriage 132, 133, 134 is raised to its uppermost position. It will be noted that the lower edges of the discs 195, 196 and 197 and the upper edge of the nose member 204 are chamfered so that during its operation the said nose member will be displaced angularly about its pivot pin 205 to allow free upward movement of said carriage. In said uppermost position of the carriage the nose piece is clear of the disc 197 so as to be returned by the spring 206 to its illustrated position with respect to the bar 134. On release of the foot pedal therefore the carriage will fall slightly to a position in which the underside of the nose member 204 is supported by the upper surface of the disc 197. In the datum or re-set position of the shaft 167 the notch 207 (FIG. 13) in the disc 197 will be angularly displaced from the nose member 204.

The machine is then started by energization of the driving motor and will effect alternate linear movements of the stator core and angular movement of the feeding members as hereinbefore described. When the carriage is supported by the engagement of the nose member 204 with the uppermost disc 197 the roller 129 (FIG. 7) will be located in a position adjacent the upper end of the slot 128. The ratio of distances between the axis of said roller and the pivot 127 on the one hand, and between said pivot and the spigot 111 on the other hand, is such as to provide a comparatively small extent of movement of the rack bar 131 with a corresponding angular movement of the shaft 146 and feeding members of FIG. 1 appropriate for winding the coils in the innermost slots of the winding. The winding proceeds in this manner while at the same time the counting shaft 167 will be driven continuously, but at a comparatively slow speed as hereinbefore indicated. The angular position of the disc 197 with respect to the shaft 167 has been made such that when the desired number of turns has been laid in said slots for the innermost coil of the winding the notch 207 in said disc will move under the nose member 204 and allow the latter to fall on to the upper surface of the disc 196, the angular position of the latter being such that at this time the notch therein is displaced from said nose member. The rack bar 131 will therefore be moved downwardly by a distance equal to the axial distance between the upper surface of the disc 196 and 197 with a corresponding increase in the distance between the axis of the roller 129 and the pivot 127. The extent of movement of the rack bar 131 is therefore correspondingly increased to effect an oscillation of the shaft 146 corresponding with the next outer slots in the stator core for forming the second coil on each pole of the winding.

The angular position of the disc 196 on the shaft 167 has been made such that when the desired number of turns has been laid in said next outer slots to complete said second coil the notch in said disc 196 will become aligned with the nose member 204 and the latter will fall on to the disc 195 and the rack bar 131 will again be moved downwardly so that the movement of the rack bar is again increased and the angular movement of the shaft 146 and wire feeding members again increased for laying the third coil in the appropriate stator slots. Again, when the third coil has been completed the notch in the disc 195 becomes aligned with the nose member 204 and the latter falls on to the disc 193 so as to effect a final increase in the movement of the rack bar 131 and shaft 146 for laying the wire in the fourth coil of each pole.

When the carriage moves to its lowermost position as above described, the plunger 220 (FIGS. 7 and 11) will engage the carriage 216 and thereby move the switch 214 from its illustrated position toward the shaft 168. It will be seen that during the previous operation the cam 222 in its several revolutions will not have engaged with the presel 215. When, however, the switch is moved to its inward position as above described, the presel 215 comes into the line of action of the cam 222 which is of part spiral or involute form. When therefore the shaft 167 has been moved by a predetermined angular amount subsequent to the movement of the carriage to its lowermost position, laying the last coils of the winding as above described, the cam 222 will engage the presel 215 and thereby operate the switch 214. Said switch is connected in any suitable circuit whereby on such operation to de-energise the driving motor 112 (FIG. 6) and so stop the machine. Circuit arrangements of this kind are well known in the art and therefore require no description herein.

The stator with the winding thereon may then be removed from the winding head and after severing of the wires at suitable points the above described operations can be repeated on another core. It will be observed that on lifting of the rack bar carriage the plunger 220 releases the carriage 216 (FIG. 11) to return the switch 214 to its illustrated position, releasing the presel 215 from the cam 222 and permitting restarting of the motor.

The notches 153 (FIGS. 8 and 10) in the rack bar 143 corresponding respectively with the slots in which the coils are wound and co-operate with the plunger 150 (FIG. 10) to determine precisely the angular position of the feeding members 10 in alignment with the splines and stator slots irrespectively of backlash in the drive to said rack bar.

It will be seen that the radial serrations on the engaging surfaces between adjacent discs 193, 195, 196 and 197 enable said discs to be adjusted in any desired angular positions on the shaft 167 after the locking ring 199 has been released and then to be locked in place by said ring in their desired positions so that the numbers of turns wound on each coil of a winding can be adjusted according to requirements. The pitch of the serrations is made such as to correspond with one revolution or a multiple of one revolution of the shaft 103.

In order to facilitate the setting of the discs in the desired positions the peripheral surfaces indicated at c in FIGS. 7 and 12 may be provided with indexing calibrations and index marks for indicating the number of turns which will be wound in given relative positions of the discs. Similarly the peripheral surface of the housing 193 may be calibrated as indicated at c' for co-operation with an index arm 223a secured to the block 223.

Preferably, (as is seen most clearly in FIG. 7), a plate 230 having a gated opening comprising notches 231 cut therein is secured to the frame plate 122, and the rack bar 131 is provided with a rearwardly extending lug 232, the under surface of which lug is in the uppermost position of the rack bar aligned with the horizontal upper edge of the plate 230 and in the other three operating positions of the rack bar carriage is aligned respectively with the horizontal surfaces of the notches 231. The upper edge of the plate 230 is interrupted at 233 and the notches 231 are separated by openings 234. These openings permit the vertical passage of the lug 232 when the rack bar 131 is in its central horizontal position. The arrangement therefore ensures that the rack bar can only be moved downwardly to change the angular movement of the wire feeding members when the rack bar is substantially in its central position.

The machine may be provided with a hand wheel 235 (FIG. 6) mounted on a bracket 236 secured to the table and connected by bevel gears 237 with the lay shaft 119. This hand wheel enables small movements of the drum cams 106 and 107 to be made by the operator in setting up a stator core on the machine. A dog-clutch (not shown) may be included between the hand wheel 235 and the lay shaft 119.

What I claim is:

1. A coil winding machine for winding coils in slots of a dynamo-electric machine stator core comprising feeding means for leading wire into slots, drive means, means coupled with the drive means for moving the stator core and feeding means relative to one another linearly, a movable rack bar coupled with the drive means for reciprocating movement of the rack bar, a tooth member having an elongated tooth face in mesh with the rack bar and coupled with one of said relatively moving parts to move the stator core and feeding means relatively to one another angularly, alternately with the movement linearly, a carriage carrying said rack bar and movable perpendicularly to the direction of the movement of the rack bar, and means for varying the stroke of the reciprocating movement of the rack bar when a required number of turns of wire have been wound in a desired pair of slots to wind the next coil in the next pair of slots.

2. A coil winding machine for winding coils in slots of a dynamo-electric machine stator core comprising feeding means for leading wire into slots, drive means, means coupled with the drive means for moving the stator core and feeding means relative to one another linearly, a movable rack bar coupled with the drive means for reciprocating movement of the rack bar, a tooth member having an elongated tooth face in mesh with the rack bar and coupled with one of said relatively moving parts to move the stator core and feeding means relatively to one another angularly, alternately with the movement linearly, a carriage carrying said rack bar and movable perpendicularly to the direction of the movement of the rack bar, the coupling of the rack bar with the drive means including a pivoted lever connected to the rack bar, and means for moving the connection of the rack bar and pivoted lever to vary the stroke of the reciprocating movement of the rack bar when the required number of turns of wire have been wound in a desired pair of slots to wind the next coil in the next pair of slots.

3. A coil winding machine for winding coils in slots of a dynamo-electric machine stator core comprising feeding means for leading wire into slots, drive means, means coupled with the drive means for moving the stator core and feeding means relative to one another linearly, a movable rack bar coupled with the drive means for reciprocating movement of the rack bar, a tooth member having an elongated tooth face in mesh with the rack bar and coupled with one of said relatively moving parts to move the stator core and feeding means relatively to one another angularly, alternately with the movement linearly, a carriage carrying said rack bar and movable perpendicularly to the direction of the movement of the rack bar, means for varying the stroke of the reciprocating movement of the rack bar when a required number of turns of wire have been found in a desired pair of slots to wind the next coil in the next pair of slots, and means co-operating with the rack bar to ensure that the variation of the stroke of the reciprocating movement and the rack bar can only take place when the rack bar is in a position corresponding to the wire feeding means being at the end of a slot.

4. A coil winding machine for winding coils in slots of a dynamo-electric machine stator core means comprising feeding means for winding wire into said slots, drive means, means coupled with the drive means for moving the stator core means and feeding means relative to one another linlearly for winding a predetermined number of turns in selected pairs of slots, a movable rack bar coupled with the drive means for reciprocating movement of the rack bar, a tooth member having an elongated tooth face in mesh with the rack bar and coupled with one of said relatively moving means to move the stator core means and feeding means relatively to one another angularly and alternately with the linear movement thereof, a carriage carrying said rack bar, means biasing said carriage to move perpendicularly to the direction of the movement of the rack bar, the position of the carriage determining the stroke of the rack bar, a shaft, means coupling said shaft with said drive means for rotation of said shaft, said coupling means including speed reduction means, a plurality of axially spaced discs, at least the first of which discs defines a notch, an abutment member connected with said carriage and ridable on said discs, means securing said discs to said shaft, said securing means providing for relative angular adjustment of said discs on said shaft prior to a winding operation for setting of the discs in an initial angular position with respect to said shaft and with the notch in a first of said discs in an angularly displaced position with respect to said abutment, means for moving said abutment against the biasing means axially of the shaft prior to a winding operation and to a position in which the abutment rides on said first disc to support the carriage against the biasing means in an initial position to thereby determine a corresponding initial reciprocating stroke of the rack bar for winding the coil in a first pair of slots, the rotation of said shaft through said speed reduction means during the winding of the coil in the first pair of slots being such that when the predetermined number of turns has been wound in the pair of slots, the notch in the first disc is aligned with the abutment to permit the abutment to move axially of said shaft to ride on a second of said discs to determine a different position of the carriage and correspondingly different reciprocating stroke of the rack bar for winding the coil in the next pair of slots.

References Cited in the file of this patent

UNITED STATES PATENTS

| | | |
|---|---|---|
| 1,612,026 | Jannell | Dec. 28, 1926 |
| 2,770,424 | Grove | Nov. 13, 1956 |